United States Patent
Liang et al.

(10) Patent No.: US 9,753,498 B1
(45) Date of Patent: Sep. 5, 2017

(54) AUXILIARY OPENING AND CLOSING MECHANISM AND PORTABLE ELECTRONIC DEVICE THEREWITH

(71) Applicant: Wistron Corporation, New Taipei (TW)

(72) Inventors: Chen-Yi Liang, New Taipei (TW); Jui-Hung Sun, New Taipei (TW); Ming-Ju Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/351,383

(22) Filed: Nov. 14, 2016

(30) Foreign Application Priority Data

Aug. 18, 2016 (TW) .............................. 105126321 A (51) Int. Cl.
*G06F 1/16* (2006.01)
*H01F 7/06* (2006.01)

(52) U.S. Cl.
CPC .......... *G06F 1/1677* (2013.01); *G06F 1/1616* (2013.01); *G06F 1/1681* (2013.01); *H01F 7/064* (2013.01)

(58) Field of Classification Search
CPC .... G06F 1/1616; G06F 1/1677; G06F 1/1681; H01F 7/064
See application file for complete search history.

(56) References Cited

U.S. PATENT DOCUMENTS

| 6,366,440 B1 * | 4/2002 | Kung ...................... E05C 19/16 361/147 |
| 2006/0006674 A1 * | 1/2006 | Kang ...................... E05C 19/16 292/251.5 |

(Continued)

FOREIGN PATENT DOCUMENTS

| CN | 205193667 U | 4/2016 |
| TW | 201502388 A | 1/2015 |

(Continued)

OTHER PUBLICATIONS

Office action dated Jan. 19, 2017 for TW application No. 105126321, filing date: Aug. 18, 2016, p. 1 line 1-14, pp. 2-3 and p. 4 line 1-18.

*Primary Examiner* — Hoa C Nguyen
*Assistant Examiner* — Christopher L Augustin
(74) *Attorney, Agent, or Firm* — Winston Hsu (57) ABSTRACT

An auxiliary opening and closing mechanism includes a moving magnetic component, an electromagnetic component, a fixing magnetic component, a detecting unit, a power unit, and a control unit. The electromagnetic component and the moving magnetic component are disposed in one of a display module and a host module of a portable electronic device. The fixing magnetic component is disposed in the other one of the display module and the host module. The detecting unit is for detecting a disposing angle of the portable electronic device. The control unit controls the power unit to provide a current for the electromagnetic component according to the disposing angle, so that the (Continued)

electromagnetic component drives the moving magnetic component to move to a first position for generating a magnetic attracting force between the moving magnetic component and the fixing magnetic component to attach the monitor module and the host module to each other.

16 Claims, 10 Drawing Sheets

(56) References Cited

U.S. PATENT DOCUMENTS

| | | | | |
|---|---|---|---|---|
| 2007/0133156 | A1* | 6/2007 | Ligtenberg | G06F 1/1616 361/679.27 |
| 2008/0158800 | A1* | 7/2008 | Aoyagi | G06F 1/1616 361/679.01 |
| 2008/0278269 | A1* | 11/2008 | Ramirez | E05C 19/16 335/205 |
| 2009/0051174 | A1* | 2/2009 | Ho | E05C 1/10 292/251.5 |
| 2009/0296328 | A1* | 12/2009 | Lin | G06F 1/1616 361/679.02 |
| 2012/0106065 | A1* | 5/2012 | Yu | E05B 15/022 361/679.27 |
| 2013/0094142 | A1 | 4/2013 | Ligtenbert | |
| 2013/0250497 | A1* | 9/2013 | Wu | G06F 1/1679 361/679.01 |
| 2014/0306463 | A1* | 10/2014 | Ho | E05C 19/16 292/251.5 |
| 2014/0355192 | A1* | 12/2014 | Lin | G06F 1/1669 361/679.17 |
| 2015/0009614 | A1 | 1/2015 | Tsai | |
| 2017/0017273 | A1* | 1/2017 | Weldon | G06F 1/1654 |
| 2017/0045912 | A1* | 2/2017 | Hsu | G06F 1/1616 |

FOREIGN PATENT DOCUMENTS

| | | |
|---|---|---|
| TW | M509362 U | 9/2015 |
| TW | I507848 B | 11/2015 |

* cited by examiner

FIG. 10

AUXILIARY OPENING AND CLOSING MECHANISM AND PORTABLE ELECTRONIC DEVICE THEREWITH

BACKGROUND OF THE INVENTION

1. Field of the Invention

The present invention relates to an auxiliary opening and closing mechanism, and more particularly, to an auxiliary opening and closing mechanism adapted for facilitating opening and closing operations of a display module and a host module, and a portable electronic device therewith.

2. Description of the Prior Art

A portable electronic device, such as a notebook computer, usually utilizes a pivoting mechanism for pivotally connecting a display module and a host module thereof, so that the display module can be pivotally folded or unfolded relative to the host module. When it is desired to fold the display module relative to the host module at a horizontal position, a gravity of the display module overcomes a resistance torque of the pivoting mechanism for driving the display module to move toward the host module. Therefore, the display module and the host module can be attached to each other closely. However, when it is desired to fold the display module relative to the host module at a non-horizontal position, such as a vertical position, the gravity of the display module cannot overcome the resistance torque of the pivoting mechanism, so that the display module and the host module cannot be attached to each other closely and are spaced from each other, which affects an aesthetic appearance of the portable electronic device and causes inconvenience of carrying.

SUMMARY OF THE INVENTION

Therefore, an objective of the present invention is to provide an auxiliary opening and closing mechanism adapted for facilitating opening and closing operations of a display module and a host module, and a portable electronic device therewith for solving the aforementioned problems.

In order to achieve the aforementioned objective, the present invention discloses an auxiliary opening and closing mechanism adapted for facilitating opening and closing operations of a display module and a host module of a portable electronic device. The auxiliary opening and closing mechanism includes a moving magnetic component, an electromagnetic component, a fixing magnetic component, a detecting unit, and a control unit. The moving magnetic component is disposed on one of the display module and the host module. The moving magnetic component has a first passive magnetic property. The electromagnetic component is disposed on the one of the display module and the host module and adjacent to the moving magnetic component. The electromagnetic component selectively magnetically repulses or magnetically attracts the moving magnetic component for driving the moving magnetic component to move along a first direction. The fixing magnetic component is disposed on the other one of the display module and the host module and located at a position corresponding to the moving magnetic component. The fixing magnetic component has a second passive magnetic property. The detecting unit is disposed in the portable electronic device and for detecting a disposing angle of the portable electronic device. The power unit is disposed in the portable electronic device and coupled to the electromagnetic component and detecting unit. The control unit is coupled to the detecting unit and the power unit. The control unit determines the portable electronic device is located at a horizontal position or a non-horizontal position according to the disposing angle detected by the detecting unit. When the control unit determines the portable electronic device is located at the non-horizontal position, the control unit controls the power unit to provide a first current for the electromagnetic component, so that the electromagnetic component generates a first active magnetic property to magnetically attract or magnetically repulse the moving magnetic component with the first passive magnetic property to move to a first position along the first direction. When the moving magnetic component is located at the first position, a first magnetic attractive force is generated between the first passive magnetic property of the moving magnetic component and the second passive magnetic property of the fixing magnetic component for attaching the display module and the host module to each other.

In order to achieve the aforementioned objective, the present invention further discloses a portable electronic device. The portable electronic device includes a display module, a host module, a pivoting mechanism, and an auxiliary opening and closing mechanism. The pivoting mechanism pivotally connects the display module and the host module. The auxiliary opening and closing mechanism is for facilitating opening and closing operations of the display module and the host module. The auxiliary opening and closing mechanism includes a moving magnetic component, an electromagnetic component, a fixing magnetic component, a detecting unit, a power unit, and a control unit. The moving magnetic component is disposed on one of the display module and the host module. The moving magnetic component has a first passive magnetic property. The electromagnetic component is disposed on the one of the display module and the host module and adjacent to the moving magnetic component. The electromagnetic component selectively magnetically repulses or magnetically attracts the moving magnetic component for driving the moving magnetic component to move along a first direction. The fixing magnetic component is disposed on the other one of the display module and the host module and located at a position corresponding to the moving magnetic component. The fixing magnetic component has a second passive magnetic property. The detecting unit is disposed in the portable electronic device and for detecting a disposing angle of the portable electronic device. The power unit is disposed in the portable electronic device and coupled to the electromagnetic component and detecting unit. The control unit is coupled to the detecting unit and the power unit. The control unit determines the portable electronic device is located at a horizontal position or a non-horizontal position according to the disposing angle detected by the detecting unit. When the control unit determines the portable electronic device is located at the non-horizontal position, the control unit controls the power unit to provide a first current for the electromagnetic component, so that the electromagnetic component generates a first active magnetic property to magnetically attract or magnetically repulse the moving magnetic component with the first passive magnetic property to move to a first position along the first direction. When the moving magnetic component is located at the first position, a first magnetic attractive force is generated between the first passive magnetic property of the moving magnetic component and the second passive magnetic property of the fixing magnetic component for attaching the display module and the host module to each other.

In summary, in the present invention, the control unit can determine that the portable electronic device is located at the horizontal position or the non-horizontal position according to the disposing angle detected by the detecting unit and further control the power unit to provide electricity for the electromagnetic component, so as to driving the moving magnetic component to move relative to the fixing magnetic component for generating the magnetic attracting force between the moving magnetic component and the fixing magnetic component. Therefore, no matter when the portable electronic device is located at the horizontal position or the non-horizontal position, the display module and the host module of the portable electronic device can be attached to each other closely by the magnetic attracting force between the moving magnetic component and the fixing magnetic component, which improves an aesthetic appearance of the portable electronic device and brings convenience of carrying.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
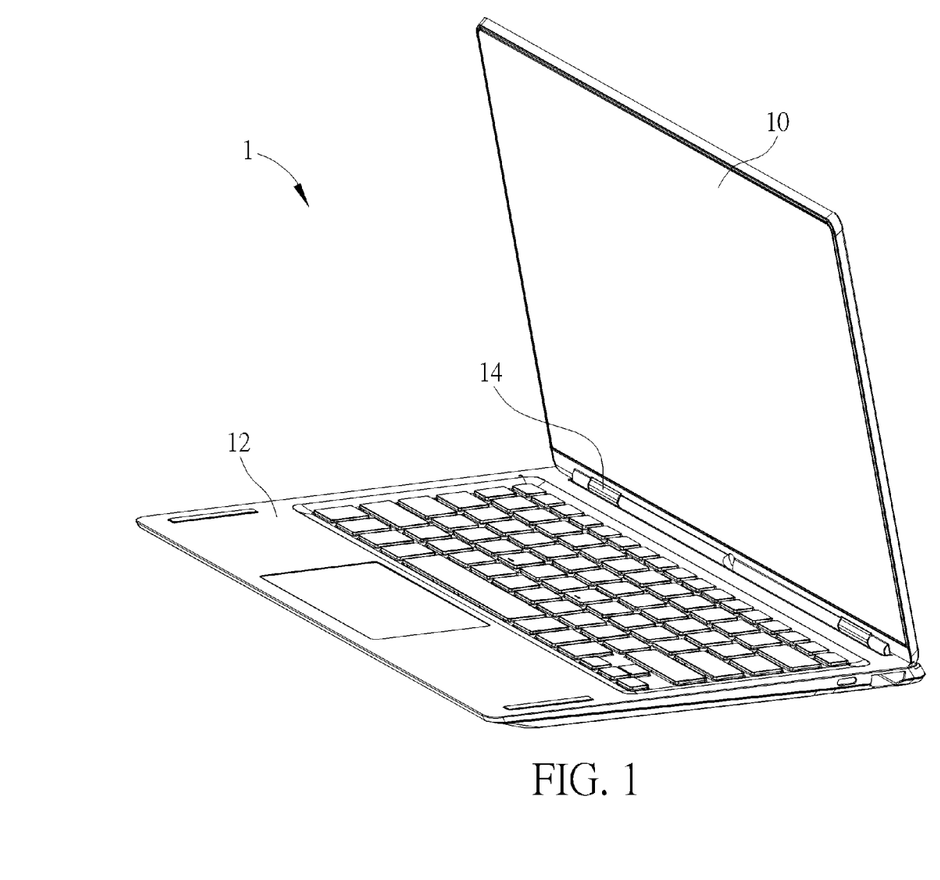
FIG. 1 is a schematic diagram of an electronic portable device according to a first embodiment of the present invention.
Figure 2:
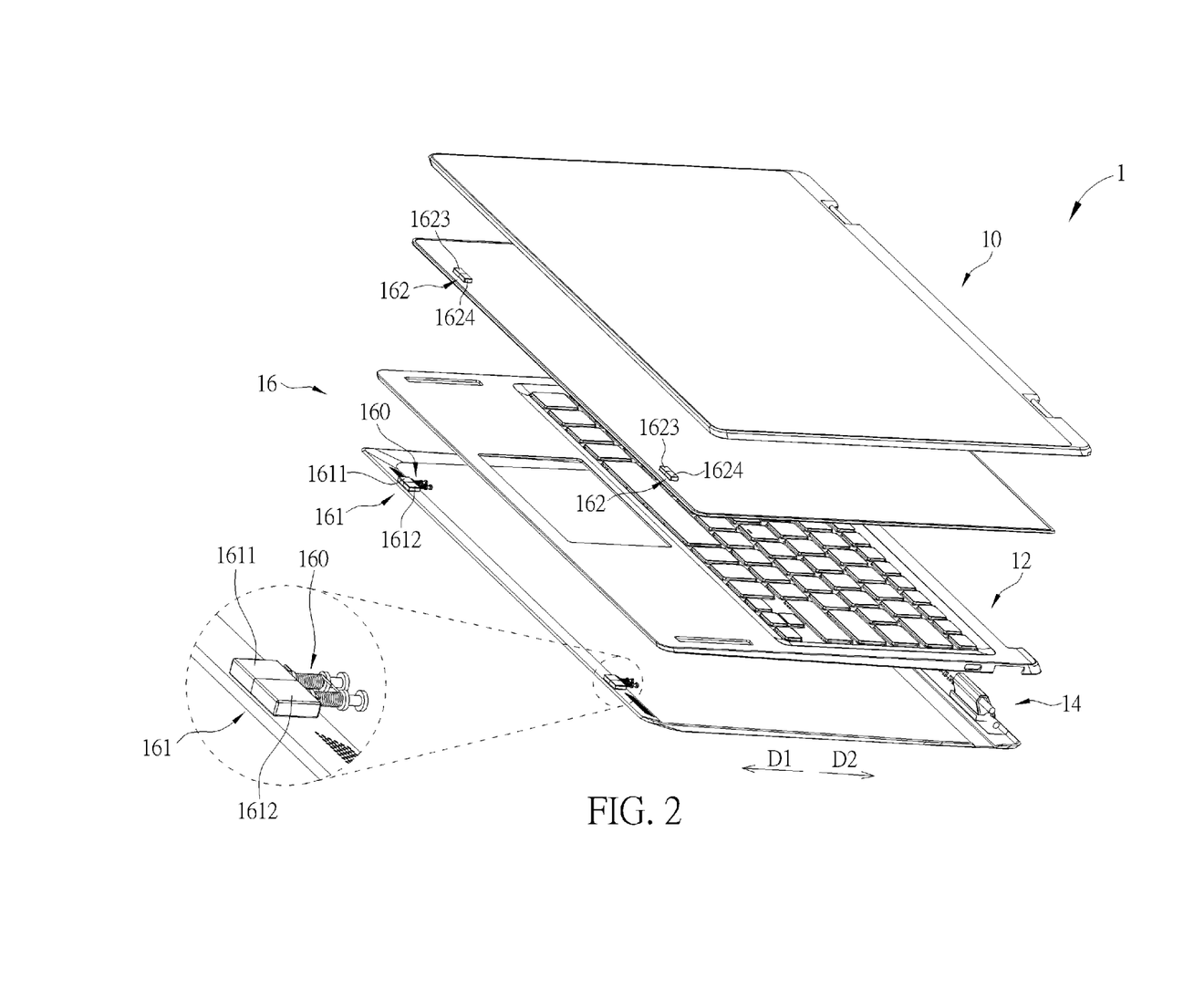
FIG. 2 is an exploded diagram of the electronic portable device according to the first embodiment of the present invention.
Figure 3:
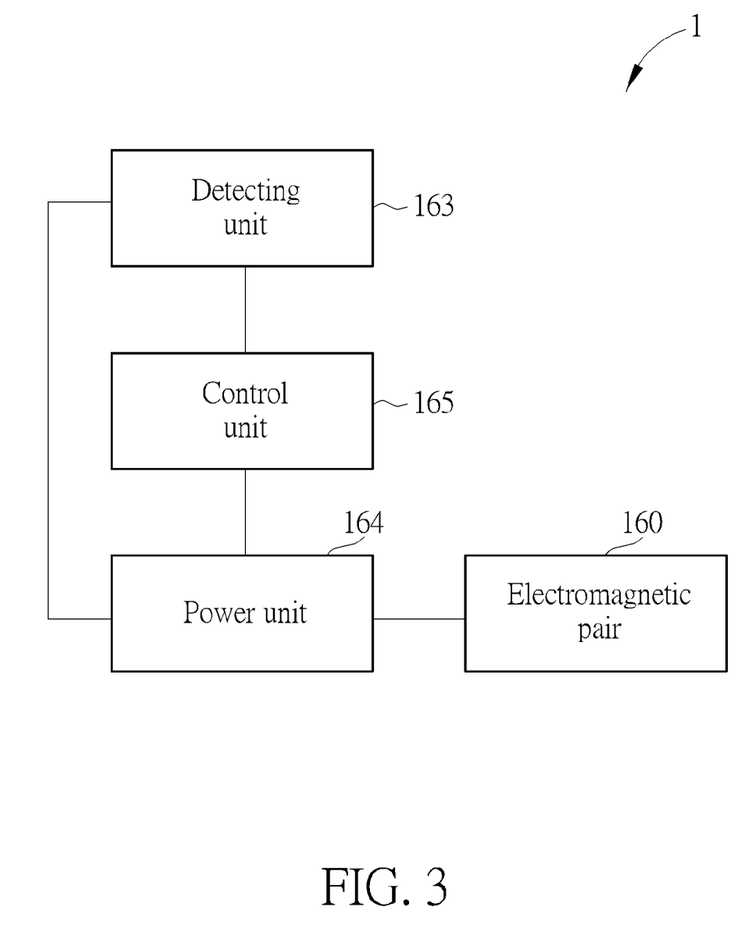
FIG. 3 is a functional block diagram of the electronic portable device according to the first embodiment of the present invention.

Please refer to FIG. 1 to FIG. 3. FIG. 1 is a schematic diagram of an electronic portable device 1 according to a first embodiment of the present invention. FIG. 2 is an exploded diagram of the electronic portable device 1 according to the first embodiment of the present invention. FIG. 3 is a functional block diagram of the electronic portable device 1 according to the first embodiment of the present invention. As shown in FIG. 1 to FIG. 3, the portable electronic device 1 can be a notebook computer in this embodiment. The portable electronic device 1 includes a display module 10, a host module 12, a pivoting mechanism 14, and an auxiliary opening and closing mechanism 16. The pivoting mechanism 14 pivotally connects the display module 10 and the host module 12. The auxiliary opening and closing mechanism 16 is for facilitating opening and closing operations of the display module 10 and the host module 12. The auxiliary opening and closing mechanism 16 includes two electromagnetic pairs 160, two moving magnetic components 161, two fixing magnetic components 162, a detecting unit 163, a power unit 164, and a control unit 165. In this embodiment, each of two electromagnetic pairs 160 includes two electromagnetic components. However, it is not limited thereto. In another embodiment, each of two electromagnetic pairs 160 can be replaced by one electromagnetic component.

The two electromagnetic pairs 160 and the two moving magnetic components 161 are disposed on two lateral sides of a front end of the host module 12, respectively. Each of the two electromagnetic pairs 160 is adjacent to the corresponding moving magnetic component 161 and for driving the corresponding moving magnetic component 161 to move along a first direction D1 or a second direction D2 opposite to the first direction D1. The two fixing magnetic components 162 are disposed on two lateral sides of a front end of the display module 10 and located at positions substantially corresponding to the two moving magnetic components 161. However, the numbers and the configurations of the electromagnetic pair 160, the moving magnetic component 161, and the fixing magnetic component 162 are not limited to those illustrated in the figures of this embodiment. It depends on practical demands. For example, in another embodiment, the auxiliary opening and closing mechanism 16 can include one electromagnetic pair 160, one moving magnetic component 161, and one fixing magnetic component 162. The electromagnetic pair 160 and the moving magnetic component 161 are disposed on a middle portion of the front end of the display module 10. The fixing magnetic component 162 is disposed on a middle portion of the front end of the host module 12 and corresponding to the moving magnetic component 161.

The detecting unit 163 is disposed in the portable electronic device 1 and for detecting a disposing angle of the portable electronic device 1. For example, in this embodiment, the detecting unit 163 can include a G sensor or a gyroscope for detecting an inclined angle of the portable electronic device 1. The power unit 164 is disposed in the portable electronic device 1 and coupled to the two electromagnetic components of each of the two electromagnetic pairs 160 and the detecting unit 163. The power unit 164 is used for providing electricity for the two electromagnetic pairs 160, so as to magnetically attract or repulse the two moving magnetic components 161, respectively. In this embodiment, the power unit 164 still can provide electricity for the detecting unit 163 even if the portable electronic device 1 is powered off. Furthermore, the power unit 164 can transform an alternating current (AC) to a direct current (DC).

The control unit 165 is electrically connected to the detecting unit 163 and the power unit 164. The control unit 165 determines that the portable electronic device 1 is located at a horizontal position or a non-horizontal position according to the disposing angle detected by the detecting unit 163. For example, the control unit 165 can determine that the portable electronic device 1 is located at the non-horizontal position when the control unit 165 determines the disposing angle is greater than a predetermined angle. On the other hand, when the control unit 165 determines the disposing angle is less than the predetermined angle, the control unit 165 can determine the portable electronic device 1 is located at the horizontal position. The predetermined angle can be configured between 35 to 45 degrees.

Each of the two moving magnetic components 161 has a first magnetic pole 1611 and a second magnetic pole 1612 opposite to the first magnetic pole 1611. A first passive magnetic property is defined by an arrangement of the first magnetic pole 1611 and the second magnetic pole 1612. Each of the two fixing magnetic components 162 has a third magnetic pole 1623 and a fourth magnetic pole 1624 opposite to the third magnetic pole 1623. A second passive magnetic property is defined by an arrangement of the third magnetic pole 1623 and the fourth magnetic pole 1624. Furthermore, the first magnetic pole 1611 is opposite to the third magnetic pole 1623. The second magnetic pole 1612 is opposite to the fourth magnetic pole 1623. In this embodiment, the arrangement of the first magnetic pole 1611 and the second magnetic pole 1612 of each of the two moving magnetic components 161 and the arrangement of the third magnetic pole 1623 and the fourth magnetic pole 1624 of each of the two fixing magnetic components 162 are perpendicular to the first direction D1 and the second direction D2, so that each of the two moving magnetic components 161 with the first passive magnetic property magnetically always magnetically attracts the corresponding fixing magnetic component 162 with the second passive magnetic property. For example, the first magnetic pole 1611 and the fourth magnetic pole 1624 can be north poles, and the second magnetic pole 1612 and the third magnetic pole 1623 can be south poles. However, it is not limited thereto.

Figure 4:
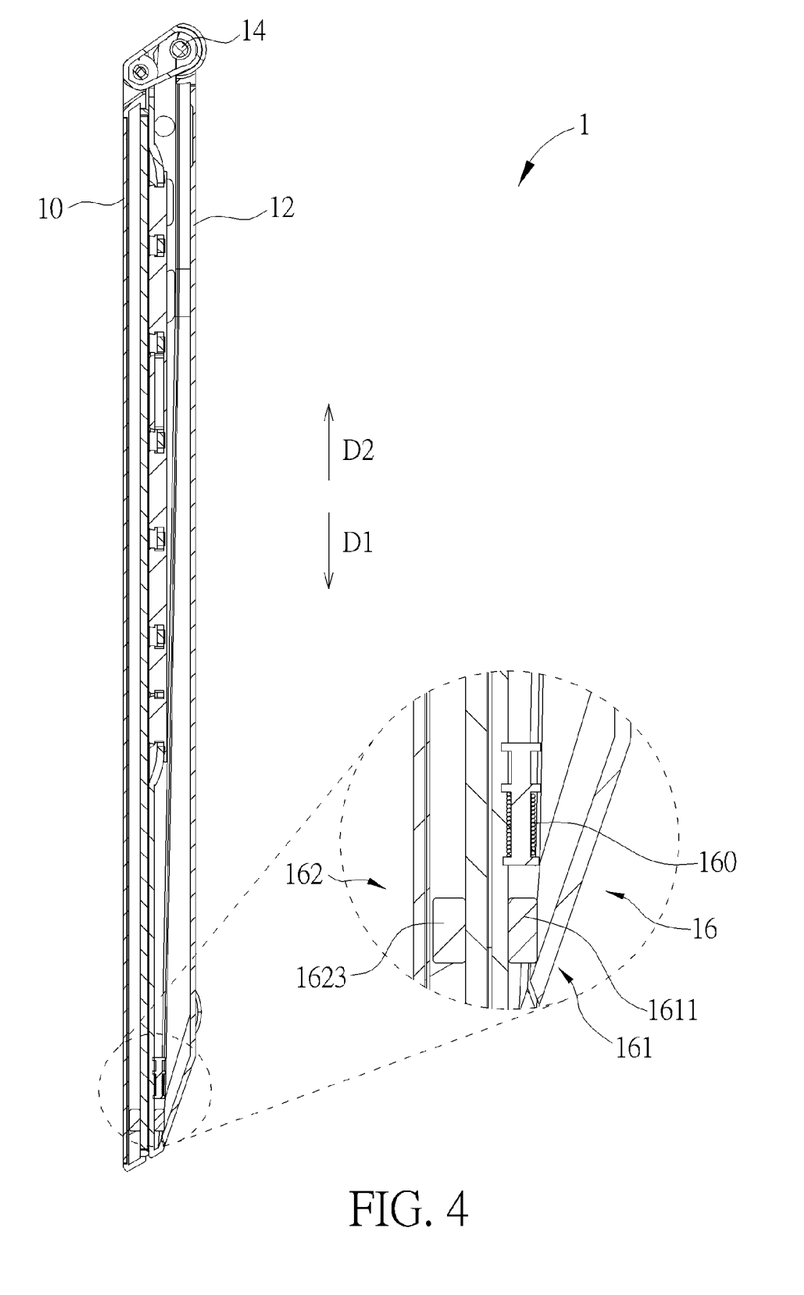
FIG. 4 is a diagram of an auxiliary opening and closing mechanism as the portable electronic device is located at a non-horizontal position according to the first embodiment of the present invention.

Please refer to FIG. 2 and FIG. 4. FIG. 4 is a diagram of the auxiliary opening and closing mechanism 16 as the portable electronic device 1 is located at the non-horizontal position according to the first embodiment of the present invention. As shown in FIG. 4, the disposing angle of the portable electronic device 1 can be 90 degrees. When the control unit 165 determines the portable electronic device 1 is switched from the horizontal position to the non-horizontal position according to the disposing angle detected by the detecting unit 163, for example, when the control unit 165 determines the disposing angle increases from an angle less than the predetermined angle to another angle greater than the predetermined angle, the control unit 165 controls the power unit 164 to provide a first current for each of the two electromagnetic pairs 160 to generate a first active magnetic property according to an magnetic arrangement of the two electromagnetic components thereof for magnetically repulsing the corresponding moving magnetic component 161 with the first passive magnetic property, so that each of the two moving magnetic components 161 is driven by the corresponding electromagnetic pairs 160 to move to a first position along the first direction D1. At this moment, the first magnetic pole 1611 and the second magnetic pole 1612 of each of the two moving magnetic components 161 are substantially aligned with the third magnetic pole 1623 and fourth magnetic pole 1624 of the corresponding fixing magnetic component 162, respectively.

Since each of the two moving magnetic components 161 with the first passive magnetic property defined by the arrangement of the first magnetic pole 1611 and the second magnetic pole 1612 thereof always magnetically attracts the corresponding fixing magnetic component 162 with the second passive magnetic property defined by the arrangement of the third magnetic pole 1623 and the fourth magnetic pole 1624 thereof, a first magnetic attracting force is generated between each of the two moving magnetic components 161 and the corresponding fixing magnetic component 162 when the first magnetic pole 1611 and the second magnetic pole 1612 of each of the two moving magnetic components 161 are substantially aligned with the third magnetic pole 1623 and the fourth magnetic pole 1624 of the corresponding fixing magnetic component 162, respectively. In such a way, when the portable electronic device 1 is located at the non-horizontal position, a resultant of the first magnetic attracting force and a part of a gravity of the display module 10 can overcome a resistance torque of the pivoting mechanism 14 for attaching the display module 10 and the host module 12 to each other closely. Furthermore, the control unit 165 can control the power unit 164 to stop providing the first current after the power unit 164 provides the first current for a predetermined period, which reduces power consumption and prevents overheating due to continuous power supply.

Figure 5:
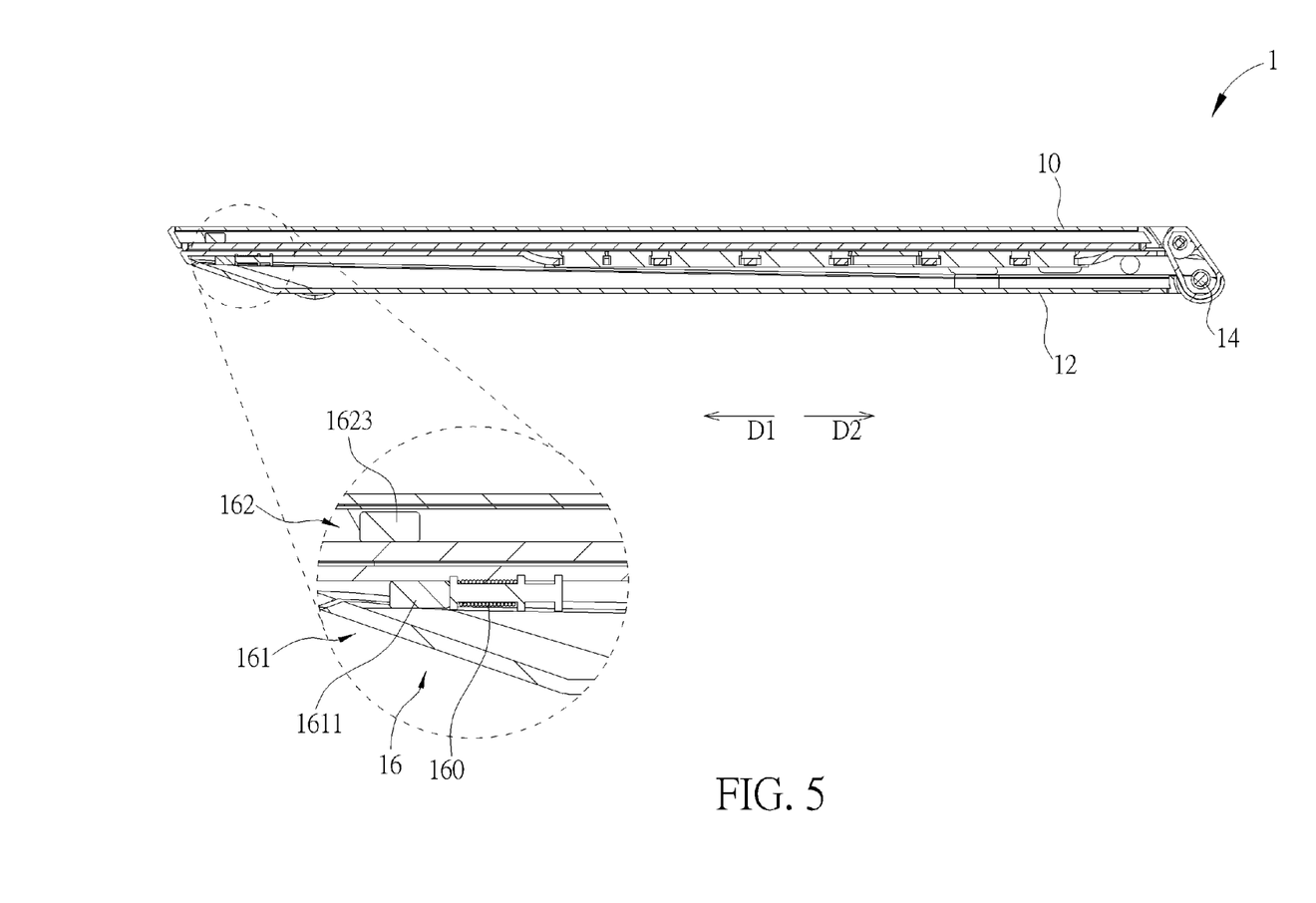
FIG. 5 is a diagram of the auxiliary opening and closing mechanism as the portable electronic device is located at a horizontal position according to the first embodiment of the present invention.

Please refer to FIG. 2 and FIG. 5. FIG. 5 is a diagram of the auxiliary opening and closing mechanism 16 as the portable electronic device 1 is located at the horizontal position according to the first embodiment of the present invention. As shown in FIG. 5, the disposing angle of the portable electronic device 1 can be 0 degree. When the control unit 165 determines the portable electronic device 1 is switched from the non-horizontal position to the horizontal position according to the disposing angle detected by the detecting unit 163, for example, when the control unit 165 determines the disposing angle decreases from an angle greater than the predetermined degree to another angle less than the predetermined degree, the control unit 165 controls the power unit 164 to provide a second current opposite to the first current for each of the two electromagnetic pairs 160 to generate a second active magnetic property opposite to the first active magnetic property according to another magnetic arrangement of the two electromagnetic components thereof for magnetically attracting the corresponding moving magnetic component 161 with the first passive magnetic property to move to a second position along the second direction D2. At this moment, the first magnetic poles 1611 and the second magnetic poles 1612 of the two moving magnetic components 161 are partially aligned with the third magnetic poles 1623 and the fourth magnetic poles 1624 of the two fixing magnetic components 162, respectively, i.e., the first magnetic poles 1611 and the second magnetic poles 1612 are partially deviated from the third magnetic poles 1623 and the fourth magnetic poles 1624, respectively.

Since each of the two moving magnetic components 161 with the first passive magnetic property always magnetically attracts the corresponding fixing magnetic component 162 with the second passive magnetic property, a second magnetic attracting force, which is less than the first magnetic attracting force, is generated between each of the two moving magnetic components 161 and the corresponding fixing magnetic component 162 when the first magnetic poles 1611 and the second magnetic poles 1612 of the two moving magnetic components 161 are partially deviated from the third magnetic poles 1623 and the fourth magnetic poles 1624 of the two fixing magnetic components 162, respectively. In such a way, when the portable electronic device 1 is located at the horizontal position, a resultant of the second magnetic attracting force and the gravity of the display module 10 can overcome the resistance torque of the pivoting mechanism 14, so that the display module 10 and the host module 12 are attached to each other closely. Furthermore, the control unit 165 also can be configured to control the power unit 164 to stop providing the second current after the power unit 164 provides the second current for a predetermined period, which reduces power consumption and prevents overheating due to continuous power supply.

In this embodiment, the two electromagnetic pairs 160 are located at inner sides of the two moving magnetic component 161. However, the configuration of the electromagnetic pair 160 is not limited to that illustrated in the figures of this embodiment. It depends on practical demands. For example, in another embodiment, the two electromagnetic pairs 160 also can be located at outer sides of the two moving magnetic components 161. The control unit 165 controls the power unit 164 to provide the first current for the each of the two electromagnetic pairs 160 to magnetically attract the corresponding moving magnetic component 161 to move to the first position along the first direction D1 when the control unit 165 determines the portable electronic device 1 is located at the non-horizontal position. On the other hand, when the control unit 165 determines the portable electronic device 1 is located at the horizontal position, the control unit 165 controls the power unit 164 to provide the second current for each of electromagnetic pairs 160 to magnetically repulse the corresponding moving magnetic component 161 to move to the second position along the second direction.

It should be noticed that when the portable electronic device 1 is located the horizontal position, the gravity of the display module 10 and the second magnetically attracting force are substantially in the same direction. Therefore, as long as the resultant of the gravity of the display module 10 and the second magnetic attracting force is greater than the resistance torque of the pivoting mechanism 14, the display module 10 and the host module 12 can be attached to each other closely. Furthermore, the gravity of the display module 10 and the first magnetically attracting force are not in the same direction when the portable electronic device 1 is located at the non-horizontal position. Therefore, the gravity of the display module 10 only contributes a component thereof for driving the display module 10 to move toward the host module 12 when the portable electronic device 1 is located at the non-horizontal position, resulting in requiring the first magnetic attracting force greater than the second magnetic attracting force. In other words, the first magnetic attracting force generated between the moving magnetic component 161 and the fixing magnetic component 162 when the portable electronic device 1 located at the non-horizontal position is greater than the second magnetic attracting force generated between the moving magnetic component 161 and the fixing magnetic component 162 when the portable electronic device 1 is located at the horizontal position.

Figure 6:
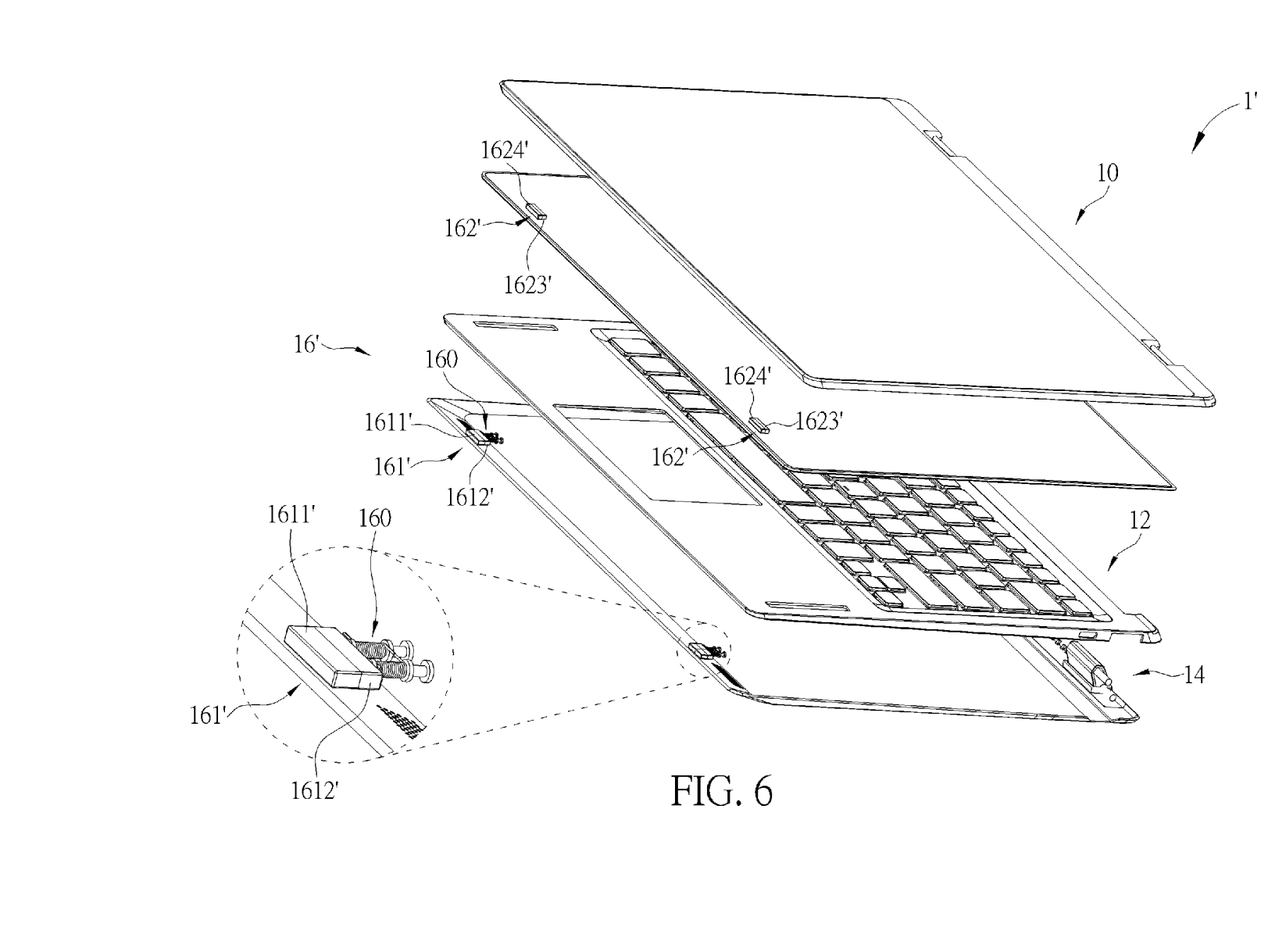
FIG. 6 is an exploded diagram of a portable electronic device according to a second embodiment of the present invention.
Figure 7:
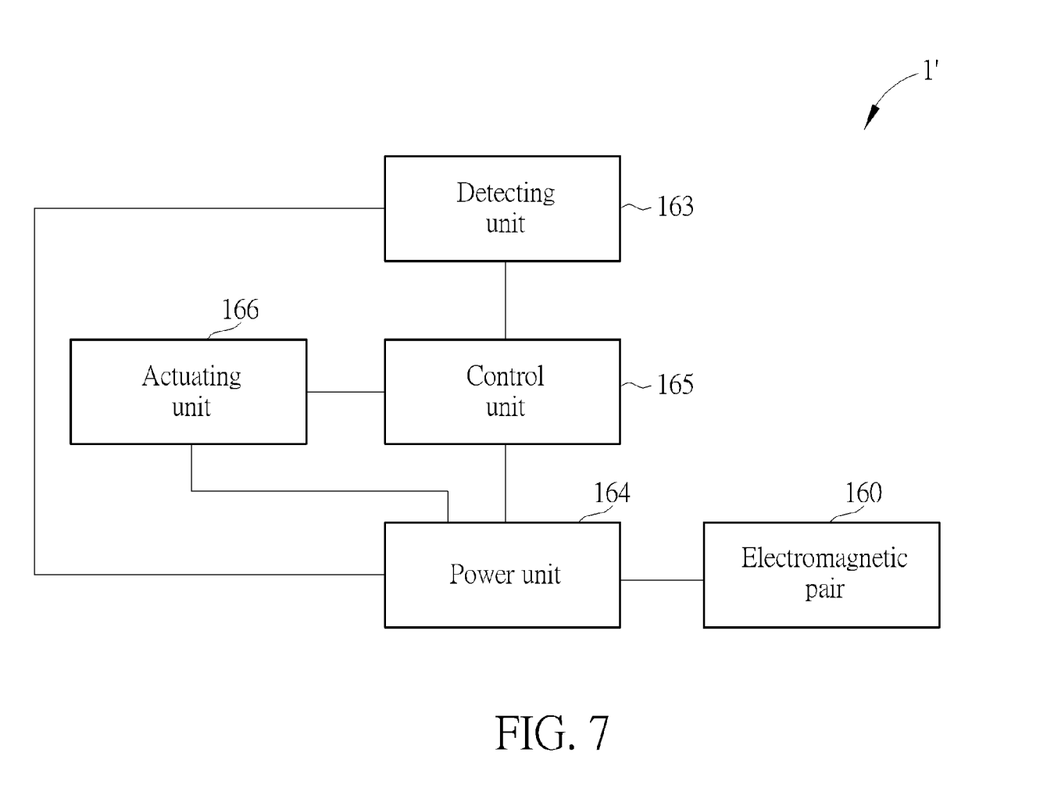
FIG. 7 is a functional block diagram of the portable electronic device according to the second embodiment of the present invention.

Please refer to FIG. 6 and FIG. 7. FIG. 6 is an exploded diagram of a portable electronic device 1' according to a second embodiment of the present invention. FIG. 7 is a functional block diagram of the portable electronic device 1' according to the second embodiment of the present invention. The difference between an auxiliary opening and closing mechanism 16' of the second embodiment and the auxiliary opening and closing mechanism 16 of the first embodiment is described as follows. As shown in FIG. 6 and FIG. 7, an arrangement of a first magnetic pole 1611' and a second magnetic pole 1612' of each of two moving magnetic components 161' of the auxiliary opening and closing mechanism 16' and an arrangement of a third magnetic pole 1623' and a fourth magnetic pole 1624 of each of two fixing magnetic components 162' of the auxiliary opening and closing mechanism 16' are parallel to the first direction D1 and the second direction D2. Furthermore, the auxiliary opening and closing mechanism 16' further includes an actuating unit 166 disposed on the portable electronic device 1' and electrically connected to the control unit 165 and the power unit 164. The actuating unit 166 is for providing an actuating signal for the control unit 165 to control the power unit 164 to provide a third current for the two electromagnetic pairs 160 to generate the first active magnetic property for magnetically repulsing the corresponding moving magnetic component 161' to move to a third position along the first direction D1. For example, in this embodiment, the actuating unit 166 can be a power switch installed on an end of the pivoting mechanism 14 and exposed outside for activating or deactivating the portable electronic device 1'. For simplicity, elements that have the same structures and functions as that illustrated in the aforementioned embodiment are provided with the same item numbers in this embodiment.

Figure 8:
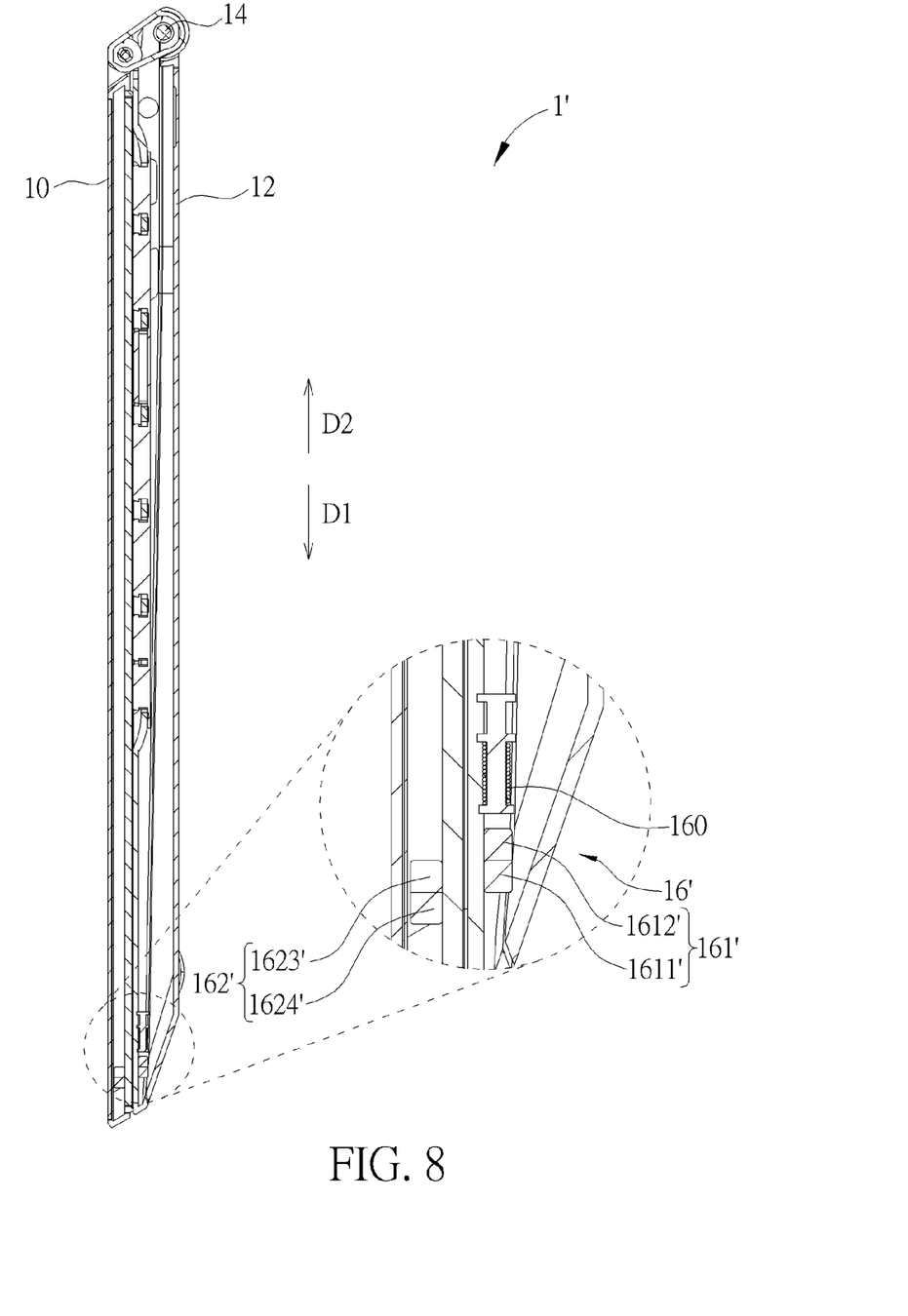
FIG. 8 is a diagram of an auxiliary opening and closing mechanism as the portable electronic device is located at a non-horizontal position according to the second embodiment of the present invention.

Please refer to FIG. 6 and FIG. 8. FIG. 8 is a diagram of the auxiliary opening and closing mechanism 16' as the portable electronic device 1' is located at a non-horizontal position according to the second embodiment of the present invention. As shown in FIG. 8, a disposing angle of the portable electronic device 1' can be 90 degrees. When the control unit 165 determines the portable electronic device 1' is switched from a horizontal position to the non-horizontal position according to the disposing angle detected by the detecting unit 163, for example, when the control unit 165 determines the disposing angle increases from an angle less than the predetermined angle to another angle greater than the predetermined angle, the control unit 165 controls the power unit 164 to provide the first current for the two electromagnetic pairs 160 to magnetically repulse the corresponding moving magnetic component 161' to move to the first position along the first direction D1. At this moment, the first magnetic pole 1611' of each of the two moving magnetic components 161' is substantially aligned with the third magnetic pole 1623' of the corresponding fixing magnetic component 162'.

Since the arrangement of the first magnetic pole 1611' and the second magnetic pole 1612' of each of the two moving magnetic components 161' and the arrangement of the third magnetic pole 1623' and the fourth magnetic pole 1624' of each of the two fixing magnetic components 162' are parallel to the first direction D1 and the second direction D2, the second magnetic pole 1612' of each of the two moving magnetic components 161' and the fourth magnetic pole 1624' of each of the two fixing magnetic components 162' are not aligned with each other and completely deviated from each other when the first magnetic pole 1611' of each of the two moving magnetic components 161' is substantially and completely aligned with the third magnetic pole 1623' of each of the two fixing magnetic components 162'. At this moment, the first magnetic attracting force is generated between each of the two moving magnetic components 161' with the first passive magnetic property and the corresponding fixing magnetic component 162' with the second passive magnetic property. A resultant of the first magnetic attracting force and a component of the gravity of the display module 10 can overcome the resistance torque of the pivoting mechanism 14 for attaching the display module 10 and the host module 12 to each other when the portable electronic device 1' is located at the non-horizontal position.

Furthermore, the control unit 165 can control the power unit 164 to stop providing the first current after the power unit 164 provides the first current for the predetermined period, which reduces power consumption and prevents overheating due to continuous power supply.

Figure 9:
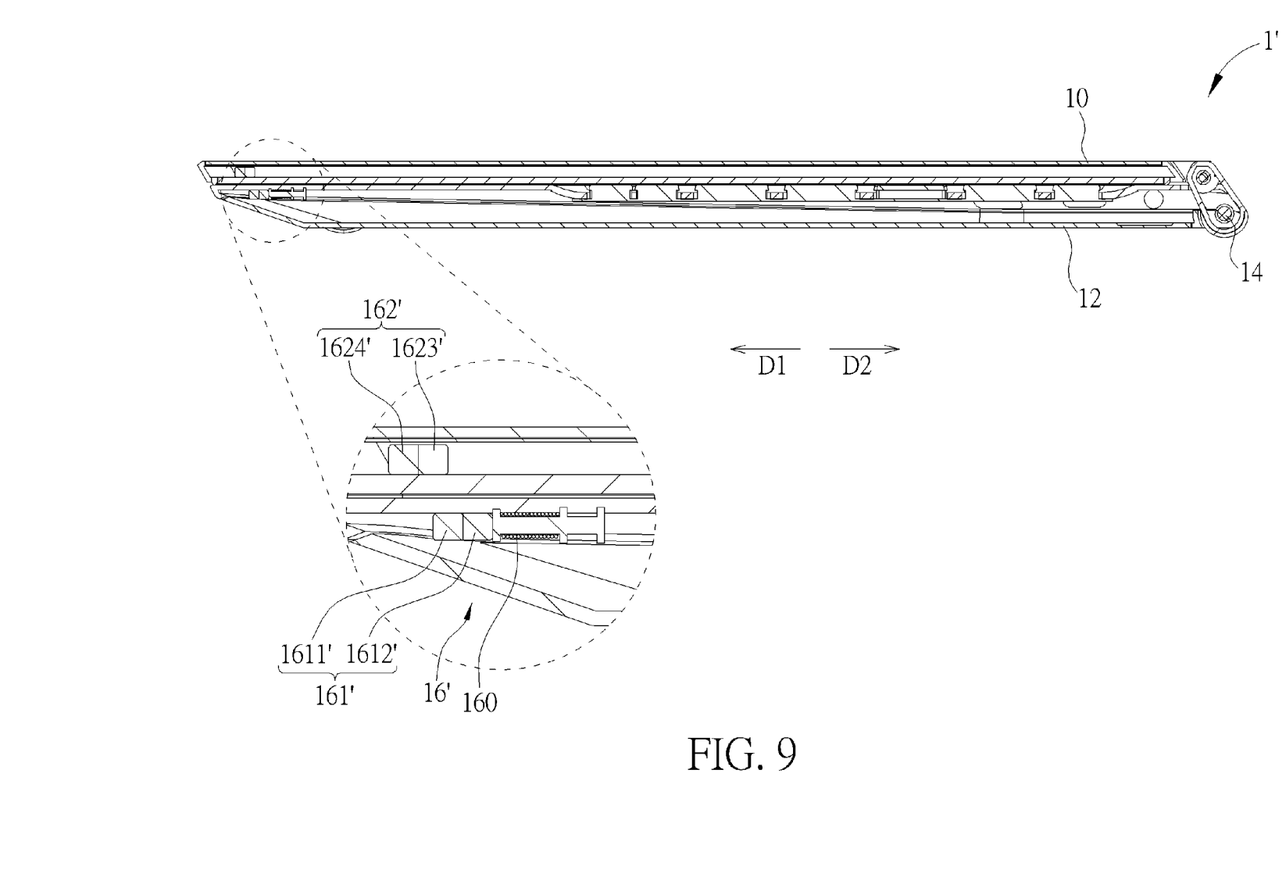
FIG. 9 is a diagram of the auxiliary opening and closing mechanism as the portable electronic device is located at a horizontal position according to the second embodiment of the present invention.

Please refer to FIG. 6 and FIG. 9. FIG. 9 is a diagram of the auxiliary opening and closing mechanism 16' as the portable electronic device 1' is located at the horizontal position according to the second embodiment of the present invention. As shown in FIG. 9, the disposing angle of the portable electronic device 1' is 0 degree. When the control unit 165 determines the portable electronic device 1' is switched from the non-horizontal position to the horizontal position, for example, when the control unit 165 determines the disposing angle decreases from an angle greater than the predetermined angle to another angle less than the predetermined angle, the control unit 165 controls the power unit 164 to provide the second current for the each of two electromagnetic pairs 160 to magnetically attract the corresponding moving magnetic component 161' to move to the second position along the second direction. At this moment, the first magnetic pole 1611' of each the two moving magnetic components 161' is partially deviated from the third magnetic pole 1623' of the corresponding fixing magnetic component 162'.

Since the arrangement of the first magnetic pole 1611' and the second magnetic pole 1612' of each of the two moving magnetic components 161' and the arrangement of the third magnetic pole 1623' and the fourth magnetic pole 1624' of each of the two fixing magnetic components 162' are parallel to the first direction D1 and the second direction D2, the second magnetic pole 1612' of each of the two moving magnetic components 161' and the fourth magnetic pole 1624' of the corresponding fixing magnetic component 162' are not aligned with each other and completely deviated from each other when the first magnetic pole 1611' of each of the two moving magnetic components 161' is partially deviated from the third magnetic pole 1623' of the corresponding fixing magnetic component 162'. At this moment, the second magnetic attracting force is generated between each of the two moving magnetic components 161' with the first passive magnetic property and the corresponding fixing magnetic component 162' with the second passive magnetic property. The resultant of the second magnetic attracting force and the gravity of the display module 10 can overcome the resistance torque of the pivoting mechanism 14 for attaching the display module 10 and the host module 12 to each other when the portable electronic device 1' is located at the horizontal position. Furthermore, since the gravity of the display module 10 can only contribute a component for partially overcoming the resistance torque of the pivoting mechanism 14 when the portable electronic device 1' is located at the non-horizontal position, the needed first magnetic attracting force is greater than the second magnetic attracting force for attaching the display module 10 and the host module 12 when the portable electronic device 1' is located at the non-horizontal position. Furthermore, the control unit 165 can control the power unit 164 to stop providing the second current after the power unit 164 provides the second current for the predetermined period, which reduces power consumption and prevents overheating due to continuous power supply.

Figure 10:
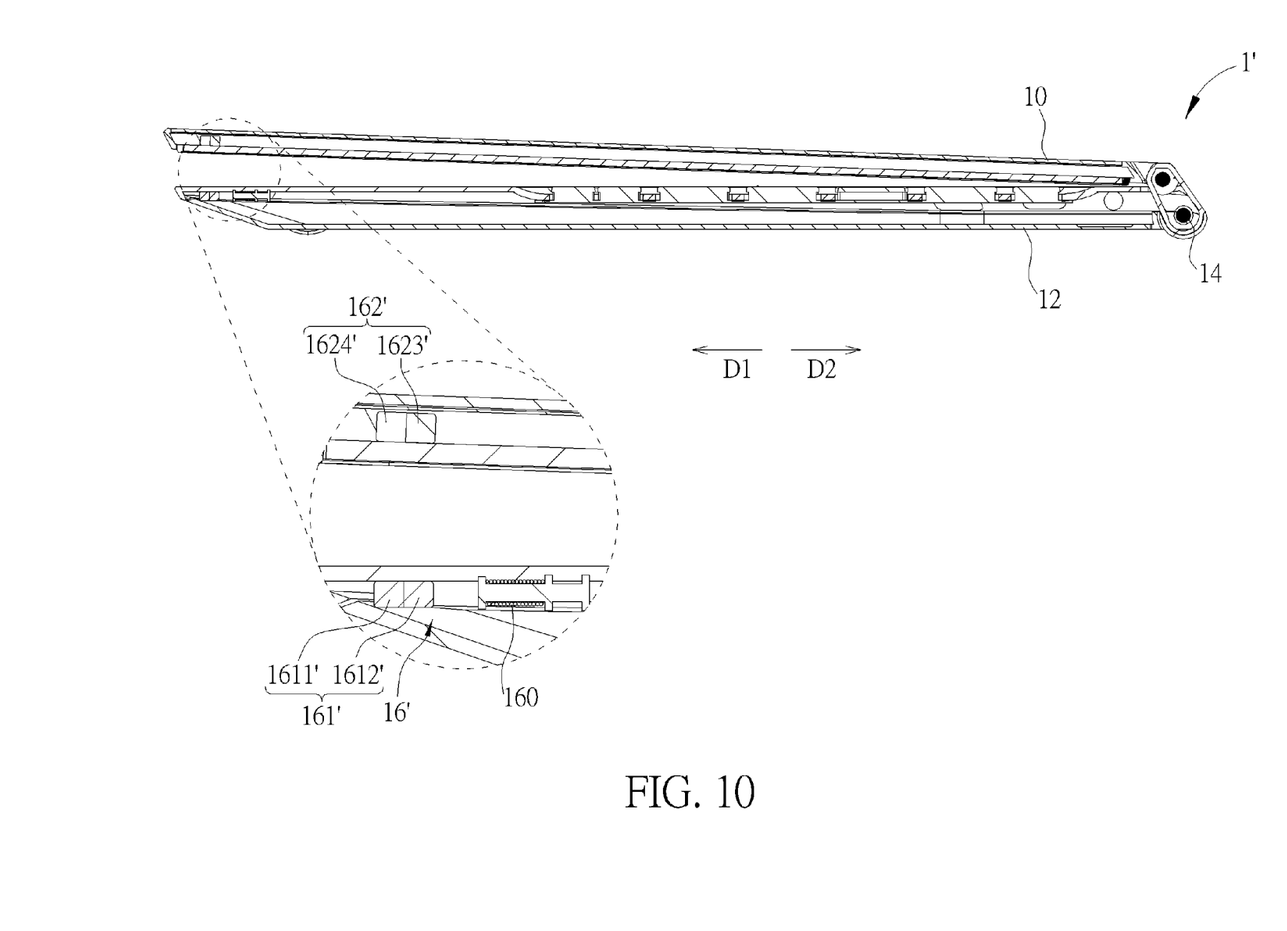
FIG. 10 is a diagram of the auxiliary opening and closing mechanism as the portable electronic device is located at an actuating position according to the second embodiment of the present invention.

Please refer to FIG. 10. FIG. 10 is a diagram of the auxiliary opening and closing mechanism 16' as the portable electronic device 1' is located at an actuating position according to the second embodiment of the present invention. As shown in FIG. 10, when the control unit 165 receives the actuating signal provided by the actuating unit 166, for example, when a user presses the actuating unit 166 to activate the portable electronic device 1', the control unit 165 controls the power unit 164 to provide the third current for each of the two electromagnetic pairs 160 to generate the first active magnetic property to magnetically repulse the corresponding moving magnetic component 161' to move to the third position along the first direction. At this moment, the first magnetic pole 1611' and the second magnetic pole 1612' of each of the two moving magnetic components 161' are exactly aligned with the fourth magnetic pole 1624' and the third magnetic pole 1623' of each of the two fixing magnetic components 162', respectively. Therefore, a magnetic repulsing force is generated between each of the two moving magnetic components 161' and the corresponding fixing magnetic component 162' for driving the display module 10 and the host module 12 to separate away from each other. In such a way, when the portable electronic device 1' is activated, the display module 10 is driven to move apart from the host module 12, which is convenient for user to unfold the display module 10 relative to the host module 12 to a using position. Furthermore, the control unit 165 can control the power unit 164 to stop providing the third current or provide the second current opposite to the third current for driving the two moving magnetic components 161' to recover and attract the two electromagnetic pairs 160 after the power unit 164 provides the third current for the predetermined period.

In contrast to the prior art, the control unit of the present invention determines that the portable electronic device is located at the horizontal position or the non-horizontal position according to the disposing angle detected by the detecting unit and further controls the power unit to provide the corresponding current for the electromagnetic component to drive the moving magnetic component to move between the first position and the second position relative to the fixing magnetic component, so as to generate the magnetic attracting force between the moving magnetic component and the fixing magnetic component. Therefore, no matter when the portable electronic device is located at the horizontal position or the non-horizontal position, the display module and the host module of the portable electronic device can be driven to attached to each other by the magnetic attracting force between the moving magnetic component and the fixing magnetic component, which improves the aesthetic appearance of the portable electronic device and brings convenience of carrying. Furthermore, the control unit further controls the power unit to provide the corresponding current for the electromagnetic component after receiving the actuating signal, so that the electromagnetic component drives the moving magnetic component to move to the third position relative to the fixing magnetic component to generate the magnetic repulsing force between the moving magnetic component and the fixing magnetic component. Therefore, the display module of the portable electronic device can be moved apart from the host module by the magnetic repulsing force between the moving magnetic component and the fixing magnetic component. Therefore, the auxiliary opening and closing mechanism of the present invention effectively facilitates opening and closing operations of the display module and host module of the portable electronic device.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An auxiliary opening and closing mechanism adapted for facilitating opening and closing operations of a display module and a host module of a portable electronic device, the auxiliary opening and closing mechanism comprising:
a moving magnetic component disposed on one of the display module and the host module, the moving magnetic component having a first passive magnetic property;
an electromagnetic component disposed on the one of the display module and the host module and adjacent to the moving magnetic component, the electromagnetic component selectively magnetically repulsing or magnetically attracting the moving magnetic component for driving the moving magnetic component to move along a first direction;
a fixing magnetic component disposed on the other one of the display module and the host module and located at a position corresponding to the moving magnetic component, the fixing magnetic component having a second passive magnetic property;
a detecting unit disposed in the portable electronic device and for detecting a disposing angle of the portable electronic device;
a power unit disposed in the portable electronic device and coupled to the electromagnetic component and detecting unit; and
a control unit coupled to the detecting unit and the power unit, the control unit determining the portable electronic device is located at a horizontal position or a non-horizontal position according to the disposing angle detected by the detecting unit;
wherein when the control unit determines the portable electronic device is located at the non-horizontal position, the control unit controls the power unit to provide a first current for the electromagnetic component, so that the electromagnetic component generates a first active magnetic property to magnetically attract or magnetically repulse the moving magnetic component with the first passive magnetic property to move to a first position along the first direction, and when the moving magnetic component is located at the first position, a first magnetic attractive force is generated between the first passive magnetic property of the moving magnetic component and the second passive magnetic property of the fixing magnetic component for attaching the display module and the host module to each other.

2. The auxiliary opening and closing mechanism of claim 1, wherein when the control unit determines the portable electronic device is located at the horizontal position, the control unit controls the power unit to provide a second current opposite to the first current for the electromagnetic component, so that the electromagnetic component generates a second active magnetic property opposite from the first active magnetic property for driving the moving magnetic component to move to a second position along a second direction opposite to the first direction, and when the moving magnetic component is located at the second position, a second magnetic attractive force less than the first magnetic attractive force is generated between the first passive magnetic property of the moving magnetic component and the second passive magnetic property of the fixing magnetic component for attaching the display module and the host module to each other.

3. The auxiliary opening and closing mechanism of claim 2, wherein the control unit controls the power unit to stop providing the first current or the second current for the electromagnetic component after the power unit provides the first current or the second current for a predetermined period.

4. The auxiliary opening and closing mechanism of claim 2, wherein the moving magnetic component comprises a first magnetic pole and a second magnetic pole opposite to the first magnetic pole, the first passive magnetic property is defined by an arrangement of the first magnetic pole and the second magnetic pole, the fixing magnetic component comprises a third magnetic pole and a fourth magnetic pole opposite to the third magnetic pole, the second passive magnetic property is defined by an arrangement of the third magnetic pole and the fourth magnetic pole, the first magnetic pole is opposite to the third magnetic pole, the second magnetic pole is opposite to the fourth magnetic pole, the first magnetic pole is substantially aligned with the third magnetic pole when the moving magnetic component is located at the first position, and the first magnetic pole is substantially deviated from the third magnetic pole when the moving magnetic component is located at the second position.

5. The auxiliary opening and closing mechanism of claim 4, wherein the second magnetic pole of the moving magnetic component is substantially aligned with the fourth magnetic pole of the fixing magnetic component when the moving magnetic component is located at the first position, the second magnetic pole of the moving magnetic component is substantially deviated from the fourth magnetic pole of the fixing magnetic component when the moving magnetic component is located at the second position, the arrangement of the first magnetic pole and the second magnetic pole of the moving magnetic component and the arrangement of the third magnetic pole and the fourth magnetic pole of the fixing magnetic component are substantially perpendicular to the first direction and the second direction.

6. The auxiliary opening and closing mechanism of claim 4, wherein the arrangement of the first magnetic pole and the second magnetic pole of the moving magnetic component and the arrangement of the third magnetic pole and the fourth magnetic pole of the fixing magnetic component are substantially parallel to the first direction and the second direction.

7. The auxiliary opening and closing mechanism of claim 6, further comprising an actuating unit disposed on the portable electronic device and coupled to the control unit, the actuating unit being for providing an actuating signal for the control unit to control the power unit to provide a third current for the electromagnetic component, so that the electromagnetic component generates the first active magnetic property to drive the moving magnetic component to move to a third position along the first direction, when the moving magnetic component is located at the third position, the first magnetic pole and the second magnetic pole of the moving magnetic component being substantially aligned with the fourth magnetic pole and the third magnetic pole of the fixing magnetic component, respectively, to generate a magnetic repulsing force between the moving magnetic component and the fixing magnetic component for separating the display module and the host module from each other.

8. The auxiliary opening and closing mechanism of claim 7, wherein the control unit controls the power unit to stop providing the third current or to provide the second current for the electromagnetic component after the power unit provides the third current for a predetermined period.

9. A portable electronic device comprising:
   a display module;
   a host module;
   a pivoting mechanism pivotally connecting the display module and the host module; and
   an auxiliary opening and closing mechanism for facilitating opening and closing operations of the display module and the host module, the auxiliary opening and closing mechanism comprising:
      a moving magnetic component disposed on one of the display module and the host module, the moving magnetic component having a first passive magnetic property;
      an electromagnetic component disposed on the one of the display module and the host module and adjacent to the moving magnetic component, the electromagnetic component selectively magnetically repulsing or magnetically attracting the moving magnetic component for driving the moving magnetic component to move along a first direction;
      a fixing magnetic component disposed on the other one of the display module and the host module and located at a position corresponding to the moving magnetic component, the fixing magnetic component having a second passive magnetic property;
      a detecting unit disposed in the portable electronic device and for detecting a disposing angle of the portable electronic device;
      a power unit disposed in the portable electronic device and coupled to the electromagnetic component and detecting unit; and
      a control unit coupled to the detecting unit and the power unit, the control unit determining the portable electronic device is located at a horizontal position or a non-horizontal position according to the disposing angle detected by the detecting unit;
   wherein when the control unit determines the portable electronic device is located at the non-horizontal position, the control unit controls the power unit to provide a first current for the electromagnetic component, so that the electromagnetic component generates a first active magnetic property to magnetically attract or magnetically repulse the moving magnetic component with the first passive magnetic property to move to a first position along the first direction, and when the moving magnetic component is located at the first position, a first magnetic attractive force is generated between the first passive magnetic property of the moving magnetic component and the second passive magnetic property of the fixing magnetic component for attaching the display module and the host module to each other.

10. The portable electronic device of claim 9, wherein when the control unit determines the portable electronic device is located at the horizontal position, the control unit controls the power unit to provide a second current opposite to the first current for the electromagnetic component, so that the electromagnetic component generates a second active magnetic property opposite from the first active magnetic property for driving the moving magnetic component to move to a second position along a second direction opposite to the first direction, and when the moving magnetic component is located at the second position, a second magnetic attractive force less than the first magnetic attractive force is generated between the first passive magnetic property of the moving magnetic component and the second passive magnetic property of the fixing magnetic component for attaching the display module and the host module to each other.

11. The portable electronic device of claim 10, wherein the control unit controls the power unit to stop providing the first current or the second current for the electromagnetic component after the power unit provides the first current or the second current for a predetermined period.

12. The portable electronic device of claim 10, wherein the moving magnetic component comprises a first magnetic pole and a second magnetic pole opposite to the first magnetic pole, the first passive magnetic property is defined by an arrangement of the first magnetic pole and the second magnetic pole, the fixing magnetic component comprises a third magnetic pole and a fourth magnetic pole opposite to the third magnetic pole, the second passive magnetic property is defined by an arrangement of the third magnetic pole and the fourth magnetic pole, the first magnetic pole is opposite to the third magnetic pole, the second magnetic pole is opposite to the fourth magnetic pole, the first magnetic pole is substantially aligned with the third magnetic pole when the moving magnetic component is located at the first position, and the first magnetic pole is substantially deviated from the third magnetic pole when the moving magnetic component is located at the second position.

13. The portable electronic device of claim 12, wherein the second magnetic pole of the moving magnetic component is substantially aligned with the fourth magnetic pole of the fixing magnetic component when the moving magnetic component is located at the first position, the second magnetic pole of the moving magnetic component is substantially deviated from the fourth magnetic pole of the fixing magnetic component when the moving magnetic component is located at the second position, the arrangement of the first magnetic pole and the second magnetic pole of the moving magnetic component and the arrangement of the third magnetic pole and the fourth magnetic pole of the fixing magnetic component are substantially perpendicular to the first direction and the second direction.

14. The portable electronic device of claim 12, wherein the arrangement of the first magnetic pole and the second magnetic pole of the moving magnetic component and the arrangement of the third magnetic pole and the fourth magnetic pole of the fixing magnetic component are substantially parallel to the first direction and the second direction.

15. The portable electronic device of claim 14, wherein the auxiliary opening and closing mechanism further comprises an actuating unit disposed on the portable electronic device and coupled to the control unit, the actuating unit is for providing an actuating signal for the control unit to control the power unit to provide a third current for the electromagnetic component, so that the electromagnetic component generates the first active magnetic property to drive the moving magnetic component to move to a third position along the first direction, when the moving magnetic component is located at the third position, the first magnetic pole and the second magnetic pole of the moving magnetic component are substantially aligned with the fourth magnetic pole and the third magnetic pole of the fixing magnetic component, respectively, to generate a magnetic repulsing force between the moving magnetic component and the fixing magnetic component for separating the display module and the host module from each other.

16. The portable electronic device of claim 15, wherein the control unit controls the power unit to stop providing the third current or to provide the second current for the electromagnetic component after the power unit provides the third current for a predetermined period.

\* \* \* \* \*